(12) United States Patent
Wang

(10) Patent No.: US 9,413,756 B1
(45) Date of Patent: Aug. 9, 2016

(54) SYSTEMS AND METHODS USING SHORT-LIVED PROXY TOKEN VALUES OBFUSCATING A STABLE LONG-LIVED TOKEN VALUE

(71) Applicant: Google Inc., Mountain View, CA (US)

(72) Inventor: Gang Wang, Frederick, MD (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/565,280

(22) Filed: Dec. 9, 2014

(51) Int. Cl.
*G06F 21/00* (2013.01)
*H04L 29/06* (2006.01)
*G06F 21/31* (2013.01)
*G06F 21/45* (2013.01)

(52) U.S. Cl.
CPC ............ *H04L 63/0853* (2013.01); *G06F 21/31* (2013.01); *G06F 21/45* (2013.01)

(58) Field of Classification Search
CPC ......... G06F 21/30; G06F 21/31; G06F 21/45; H04L 9/321; H04L 9/3213; H04L 9/3234; H04L 63/08; H04L 63/0807
See application file for complete search history.

(56) References Cited

U.S. PATENT DOCUMENTS

2014/0026193 A1* 1/2014 Saxman .................. G06F 21/33 726/4

* cited by examiner

*Primary Examiner* — Edward Zee
(74) *Attorney, Agent, or Firm* — Fish & Richardson P.C.

(57) ABSTRACT

Systems and methods in which an intermediary server provides a proxy token value in lieu of a stable token value to a third-party. The intermediary server identifies a stable token value associated with a first-party and accesses a knowledge base to determine a length of time since a third-party used a first proxy token value in a prior action, where the first proxy token value had previously been presented to the third-party in lieu of the stable token value. The intermediary server determines that the length of time since the third-party used the proxy token value in the prior action exceeds a maximum reliability time threshold and, responsive to the determination, generates a second proxy token value. The intermediary server then provides, to the third-party, an invitation to use the second proxy token value in an action, the invitation omitting the stable token value and the first proxy token value.

20 Claims, 5 Drawing Sheets

SYSTEMS AND METHODS USING SHORT-LIVED PROXY TOKEN VALUES OBFUSCATING A STABLE LONG-LIVED TOKEN VALUE

BACKGROUND

An intermediary back-end server can facilitate information exchange between a first-party and a third-party. Generally, the intermediary back-end server uses a stable token value associated with the first-party to represent the first-party to the third-party. The stable token value may persist unchanged for a long time. The stable token value can contain information that corresponds to user-agnostic information or to user-provided information, but usually does not identify the first-party beyond the context of the information exchange. A third-party that consistently receives a stable token value may be able to determine information associated with the first-party that was not meant to be disclosed.

SUMMARY

In some aspects, the disclosure relates to a system that includes at least a data storage element storing a knowledge base, and an intermediary server in communication with the data storage element. The intermediary server includes at least one network interface and at least one processor. The processor is configured to execute instructions to identify a stable token value associated with a first-party and access the knowledge base to determine a length of time since a third-party used a first proxy token value in a prior action, where the first proxy token value had previously been presented to the third-party in lieu of the stable token value. The processor is configured to execute instructions to determine that the length of time since the third-party used the proxy token value in the prior action exceeds a maximum reliability time threshold and, responsive to the determination, generate a second proxy token value, different from the first proxy token value and different from the stable token value. The processor is configured to execute instructions to then provide, to the third-party, the second proxy token value, without providing the stable token value and without providing the first proxy token value.

In some aspects, the disclosure relates to a method performed by an intermediary server. The intermediary server identifies a stable token value associated with a first-party and access the knowledge base to determine a length of time since a third-party used a first proxy token value in a prior action, where the first proxy token value had previously been presented to the third-party in lieu of the stable token value. The intermediary server determines that the length of time since the third-party used the proxy token value in the prior action exceeds a maximum reliability time threshold and, responsive to the determination, generates a second proxy token value, different from the first proxy token value and different from the stable token value. The intermediary server then provides, to the third-party, the second proxy token value, without providing the stable token value and without providing the first proxy token value.

In some aspects, the disclosure relates to computer-readable media storing instructions that, when executed by a computing device including one or more computing processors, causes the computing device to identify a stable token value associated with a first-party and access a knowledge base to determine a length of time since a third-party used a first proxy token value in a prior action, where the first proxy token value had previously been presented to the third-party in lieu of the stable token value. The instructions cause the processor to execute instructions to determine that the length of time since the third-party used the proxy token value in the prior action exceeds a maximum reliability time threshold and, responsive to the determination, generate a second proxy token value, different from the first proxy token value and different from the stable token value. The instructions then cause the processor to provide, to the third-party, the second proxy token value, without providing the stable token value and without providing the first proxy token value.

BRIEF DESCRIPTION OF THE DRAWINGS

The above and related objects, features, and advantages of the present disclosure will be more fully understood by reference to the following detailed description, when taken in conjunction with the accompanying figures, wherein.

For purposes of clarity, not every component may be labeled in every figure. The drawings are not intended to be drawn to scale. Like reference numbers and designations in the various figures indicate like elements

DETAILED DESCRIPTION

An intermediary back-end server facilitates the exchange of information between a front-end user interface based on input from a third-party. The intermediary back-end server uses a stable token value associated with the front-end user interface to distinguish it from other front-end user interfaces. The stable token value may persist unchanged for a long time. The stable token value can contain information that corresponds to user-agnostic information or to user-provided information, but generally does not identify a user of the front-end interface. However, the third-party does not receive the stable token value. The third-party only receives a short-lived proxy token value, generated as a substitute for the stable token value, and which contains no information identifying the user. The proxy token value is associated with the front-end user interface for only a limited length of time, after which a new proxy token value is used.

Third-parties use the proxy token values to indicate specific front-end user interfaces for various information exchanges. The third-party may consider different interactions with the same proxy token value as corresponding to interaction with the same user, and use composite information drawn from multiple interactions to modify the exchange of information with the corresponding front-end interface. In some implementations, the information exchange includes providing content to the front-end interface for presentation to a user. In such implementations, the third-party may use composite information drawn from multiple interactions to make enhanced content selections, e.g., sequential or responsive content selections, or to identify correlations between content presentations and subsequent interactions. In some implementations, once the context of the information exchange is complete, the short-lived proxy token value expires. Any composite information generated by the third-party based on the expired proxy token value is limited, and cannot be expanded beyond the limited scope intended.

Figure 1:
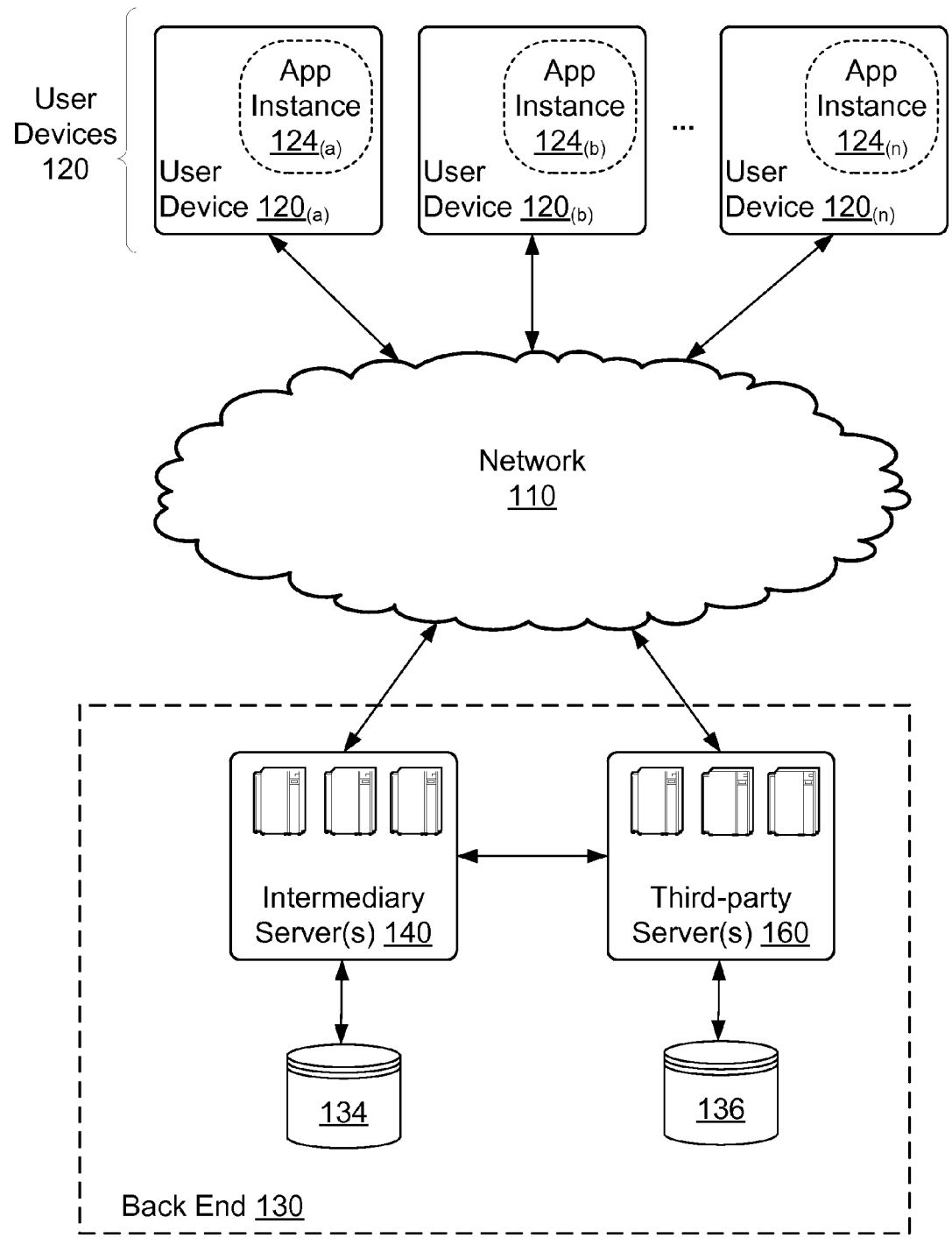
FIG. 1 is a block diagram of a network environment.

FIG. 1, in broad overview, is a block diagram of a network environment in which the interactions introduced above can take place. A network 110 enables communication between various user devices 120 and servers on a back end 130. Each user device $120_{(a)}$-$120_{(n)}$ executes respective instances $124_{(a)}$-$124_{(n)}$ of one or more applications that may interact with the back end 130. The application instances $124_{(a)}$-$124_{(n)}$ (generally referred to as an instance 124) each transmit requests to, and receive data from, servers on the back end 130 via the network 110. The back end 130 includes data storage systems 134 and 136, intermediary servers 140, and third-party servers 160. The intermediary servers 140 receive requests from the application instances 124 executing on the user devices 120 and enable the third-party servers 160 to participate in responding to the respective requests.

In more detail, the network 110 conveys information between the user devices 120 and servers in the back end 130. The network 110 is composed of various network devices linked together to form one or more communication paths between participating devices. Each networked device includes at least one network interface for transmitting and receiving data, typically as one or more packets. The network interfaces link the networked devices to the network 110, and thus, through the network 110, to each other. An illustrative network 110 is the Internet; however, other networks may be used. The network 110 may be composed of multiple connected sub-networks. The network 110 can be a local-area network (LAN), such as a company intranet, a metropolitan area network (MAN), a wide area network (WAN), an internetwork such as the Internet, or a peer-to-peer network, e.g., an ad hoc WiFi peer-to-peer network. The data links between devices in the network 110 may be any combination of wired links (e.g., fiber optic, coaxial, Cat-5, Cat-5e, Cat-6, etc.) and/or wireless links (e.g., radio, satellite, or microwave based). The network 110 may be public, private, or a combination of public and private networks. The network 110 may be any type and/or form of data network and/or communication network.

Figure 6:
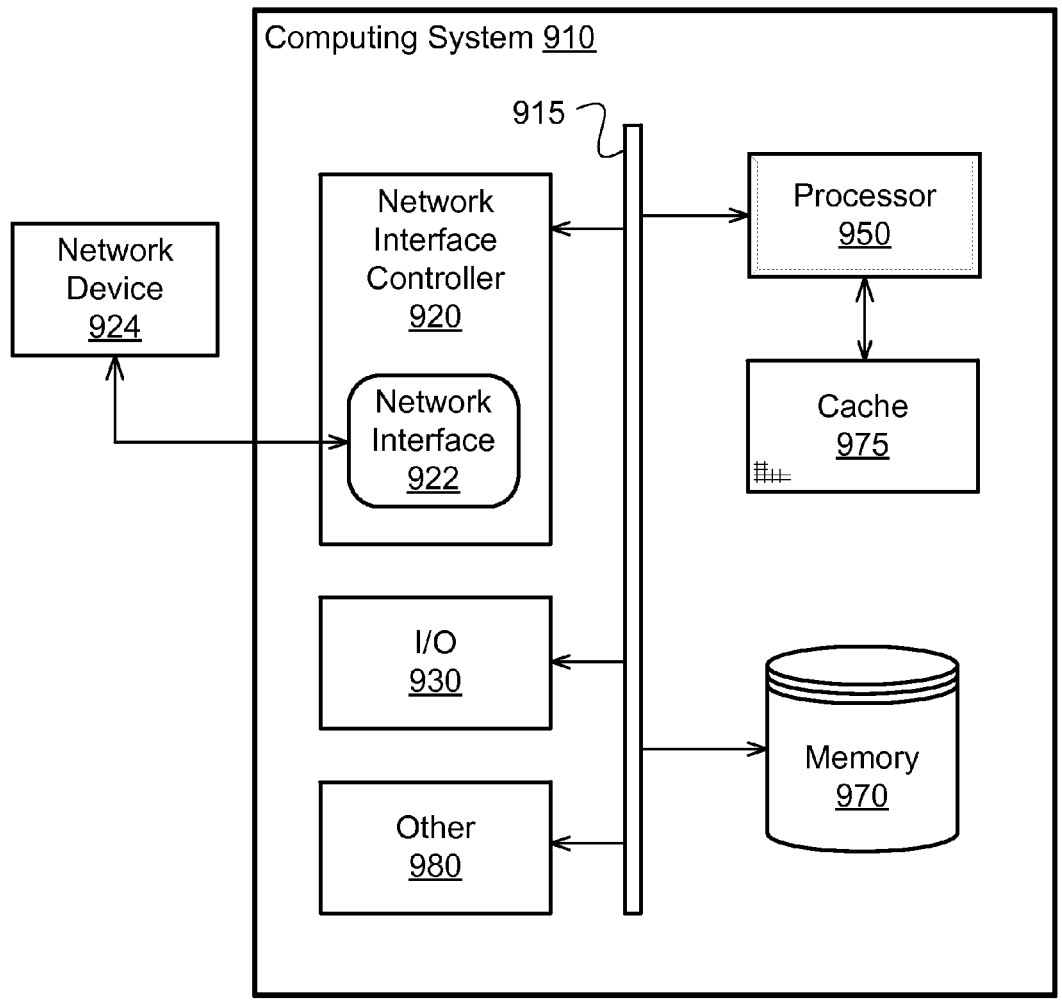
FIG. 6 is a block diagram of a computing system suitable for use in the various implementations described.

A user device 120 is capable of exchanging information via the network 110. A user device 120 may be any kind of computing device configured for user interaction. A user device 120 may be a laptop, desktop, tablet, electronic pad, personal digital assistant, smart phone, video game device, television, television auxiliary box (also known as a "set-top box"), kiosk, portable computer, or any other such device capable of presenting content to a user or facilitating presentation of content to a user. A user device 120 typically runs an operating system that manages execution of software applications on the user device 120. In some implementations, the operating system is provided with the user device 120. Applications execute within a computing context controlled by the operating system, i.e., "on top" of the operating system. Applications may be natively installed with the operating system, or installed later, e.g., by a user. An application instance 124 executing on a user device 120 can provide for interaction between a user of the device 120 and services provided by the back end 130 via the network 110. The computing device described in reference to FIG. 6 is a computing device that, in some configurations, is suitable for use as a user device 120.

The servers in the back end 130 ("back-end servers") include intermediary servers 140 and third-party servers 160, described in more detail below. The back-end servers 130 may also include any other facilitative systems including network devices such as routers and switches, data processing and filtering servers, data storage systems 134 and 136, application servers, content servers, and so forth. The back-end servers 130 may be housed in a single location or distributed across multiple locations connected by the network 110 and/or by a secondary back-bone network. Some back-end servers 130 may be virtualized, i.e., a back-end server 130 may be hosted as a virtual machine on another computing device. In some instances, one or more virtual servers may be hosted by a third-party cloud services provider. Some back-end servers 130 may be implemented in custom hardware. Some back-end servers 130 may be generic computing devices configured with specific, non-generic, functionality. The computing device described in reference to FIG. 6 is a computing device that, in some configurations, is suitable for use as a back-end server 130.

The back-end 130 includes data storage 134 and 136, which may each be any device, or collection of devices, suitable for storing computer readable data. Data storage 134 and data storage 136 may be the same data storage device, the same types of data storage devices, or different types of data storage devices. Suitable data storage devices include volatile or non-volatile storage, network attached storage, and storage area networks. A data storage device may incorporate one or more mass storage devices, which may be co-located or distributed. Devices suitable for storing data include semiconductor memory devices such as EPROM, EEPROM, SDRAM, and Flash memory devices. Devices suitable for storing data include magnetic disks, e.g., internal hard disks or removable disks, magneto optical disks, and CD ROM, DVD-ROM, and Blu-Ray® disc drives. Data storage devices may be virtualized. Data storage devices may be accessed via an intermediary server and/or via a network. Data storage devices may structure data as a collection of files, data blocks, or chunks. Data storage devices may provide for error recovery using, for example, redundant storage and/or error recovery data (e.g., parity bits). The data storage 134 and/or the data storage 136 may each host a database, e.g., a relational database. In some implementations, data is recorded as entries in one or more database tables in a database stored at data storage 134 and/or at data storage 136. In some such implementations, the data is accessed using a query language such as SQL. The data storage 134 and/or the data storage 136 may each host a file storage system. Data may be stored structured as a knowledge base. Data may be stored in an encrypted form. Access to the data storage 134 and/or the data storage 136 may be restricted by one or more authentication systems.

A user may operate a user device 120 to remotely interact with various back-end servers 130 via the network 110, e.g., using one or more application instances 124. In some scenarios, an application instance 124 may request one or more content items from a back-end server 130. An intermediary server 140, in the back end 130, receives a content request and causes content to be delivered from one or more content servers to the client device 120 via the network 110. The client device 120 then renders the received content for presentation to the user. The rendered content is usually, but not necessarily, presented within the context of the requesting application instance 124. The user device 120 and the application instance 124 thus act as a user interface.

A user session can be formed from a set of requests, responses, and subsequent requests between a user interface and the back-end servers 130. The user's session may begin with a first interaction, e.g., an authentication sequence. The user's session may continue until a terminal interaction, or until the user stops requesting content items. In some implementations, the session is kept alive for a fixed period of time after delivery of the last content item, providing the user time to engage the content and make a subsequent request. In some implementations, content delivered to the client device 120 is configured to periodically make requests to a back-end server 130 to keep the session alive. In some implementations, a session is a logical grouping of requests from a client device 120 over a period of time. A session may last anywhere from a few seconds to a few days or weeks. In some instances, a session is only recognizable after a number of interactions in the session have already occurred. Multiple sessions may be combined to form a larger session, such as when the authentication sequence is repeated within a short window of time. In some instances, sessions from multiple client devices 120 associated with the same user or user account can be combined to form a larger session.

In some implementations, there is an identifier that may be used by the intermediary server 140 to distinguish between various user devices $120_{(a)}$-$120_{(n)}$ or application instances $124_{(a)}$-$124_{(n)}$. The identifier may be unique. In some implementations, an IP address is used as an identifier. In some implementations, a manufacturer or vendor assigns a user device 120 a permanent system identifier, such as a DUID, INID, IMSI, or MIN, recorded, e.g., in a SIM card, to be used as an identifier. In some implementations, a user supplies information used to identify an application instance 124. In some implementations, an identifier is provided to an application instance 124 and stored at the hosting user device 120, e.g., as a cookie stored by a Web browser application. When a user device 120 interacts with a back-end server 130, the user device 120 may provide the server 130 with the stored identifier. In some implementations, the identifier provided for storage at the user device 120 is an arbitrary or randomly selected number or character string. In some implementations, a back-end server 130 maintains a sequence number; for each first interaction with a user device 120 (where the user device doesn't already have a stored sequence number), the server 130 sends the sequence number to the newly encountered user device 120 as an identifier and then increases the sequence number by some fixed or dynamic amount. In some implementations, the identifier provided for storage at the user device 120 is a function of the date and time of a first interaction between the user device 120 and the back-end server 130. In some implementations, each application instance 124 receives its own identifier that is not affiliated with identifiers used by other applications on the same host user device 120. In some implementations, the identifier provided for storage at the user device 120 has no meaning other than that it is uniquely assigned to a particular instance of a user device 120 (or application 124 executing on a user device 120) such that the identification in no way identifies, or is associated with, a user's personal identity, online or offline.

The intermediary servers 140 may interact with one or more third-party servers 160 to facilitate providing content to the user devices 120. The intermediary servers 140 can provide a proxy token value to a third-party without providing the stable token value to the third-party. In some implementations, an intermediary server 140 may invite one or more third-party servers 160 to participate in an interaction with a user device 120. The invitation includes a proxy token value that corresponds, for a short while, to the specific user device 120; but the invitation does not identify the specific user device 120. The third-party servers 160 can take various actions responsive to this invitation, and specify the user device 120 using the proxy token value. In some implementations, an intermediary server 140 may solicit requests from various third-party servers 160 to include, in an interaction with a user device 120, content specific to the respective third-party servers 160. The resulting requests by the third-party servers 160 are actions that rely on the proxy token value. In some implementations, the third-party servers 160 that have taken actions relying on the proxy token value may receive an assurance that the proxy token value won't expire for at least a specified length of time. In some implementations, the assurance is included in a response to an action request. In some implementations, the assurance is an out-of-band agreement with the third-party. In some implementations, the assurance excludes situations where the stable token value changes. In some implementations, the assurance excludes situations where the proxy token value has persisted for a maximum period of time.

The intermediary server 140 stores information in the data storage system 134 related to providing the proxy token value to a third-party. In some implementations, each third-party is assigned an identifier value, and the intermediary servers 140 stores an association between the third-party identifier value, the proxy token value, and one or more date stamps related to when the proxy token value was provided to the third-party. In some such implementations, the data storage system 134 stores entries associating the third-party identifier value, the proxy token value, a first-used date, and a last-relied-upon date (if any). In some implementations, the stable proxy token value is stored. In some such implementations, the data storage system 134 stores entries associating the third-party identifier value, the stable token value, a first-used date, and a last-relied-upon date (if any). In some implementations, the proxy token value is generated as a function of the third-party identifier value, the stable token value, and a first-used date. A new proxy token value is created by changing the first-used date. If the last-relied-upon date pre-dates the first-used date, then the third-party has not taken an action relying on the proxy token value. Other variations for storing information in the data storage system 134 related to the proxy token value are also within the scope of this disclosure.

Figure 2:
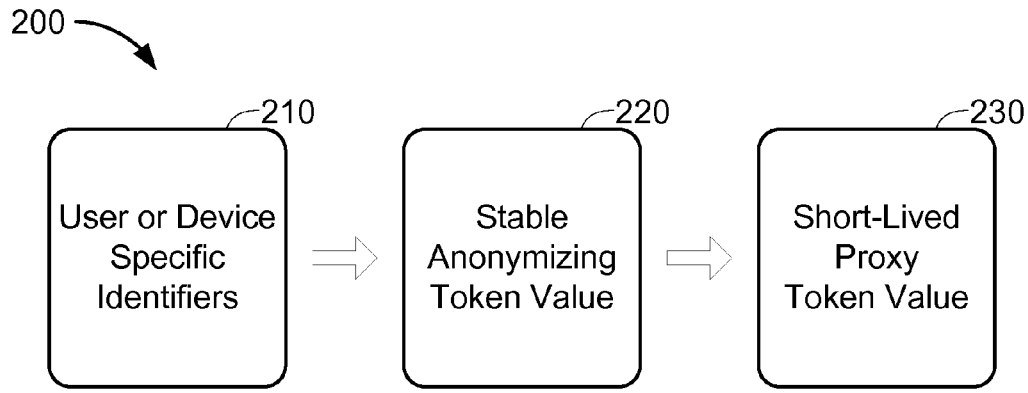
FIG. 2 is a block diagram showing levels of obfuscation.

FIG. 2 is a block diagram showing the levels of obfuscation used to prevent exposure of user-identifying information to a third-party. The lowest level is a user or device-specific identifier 210, which may convey side-band information as described below. Any user identifying information, including the side-band information, that might be conveyed by the user or device-specific identifier 210 is removed through use of a stable anonymizing token value 220. The stable anonymizing token value 220 is further obfuscated by using a short-lived proxy token value 230, where the shortened life-span of the proxy token value limits third-party recipients from using the token value to build a lengthy history of user interactions.

Referring to FIG. 2 in more detail, a user or device specific identifier 210 may include user-agnostic or user-provided information. In some implementations, the identifier 210 is a network identifier such as an IP address or a mobile-device identifier (e.g., an IMSI). Although a network identifier does not identify an end-user, it usually reduces the number of possible users dramatically. Network identifiers also do not usually change frequently. Furthermore, network identifiers may carry side-band information, such as identification of the network-service provider that services a particular address range or the geographic region associated with the address range or service-provider. Any additional information that can be correlated back to the identifier 210 constitutes side-band information.

A stable anonymizing token value 220 is a random value that can be associated with the user or user device without any risk of carrying such side-band information. In some implementations, the stable anonymizing token value 220 is generated by the user device 120. In some implementations, the stable anonymizing token value 220 is generated by a back end server 130. In some implementations, the stable anonymizing token value 220 is associated with multiple user devices, e.g., where a user account has been accessed from multiple devices. In some implementations, a back end server 130 can identify a stable anonymizing token value 220 based on information associated with a client device 120. In some implementations, a back end server 130 can identify a stable anonymizing token value 220 based on information associated with a service account authorized for access from the client device 120. In some implementations, a back end server 130 can identify a stable anonymizing token value 220 based on information associated with an application instance 124 executing on the client device 120.

In some implementations, the user can cause the stable anonymizing token value 220 to be reset at any time. In some such implementations, the user resets the stable anonymizing token value 220 at a user device 120. In some implementations, the user submits a request to a back end server 130, where the request includes an instruction to reset the stable anonymizing token value 220. In some implementations, the stable anonymizing token value 220 is automatically reset at regular long-term intervals, e.g., by a back end server 130. However, if a third-party receives the stable anonymizing token value 220 repeatedly over a sufficiently long period of time, in various presentation contexts, then the third-party may be able to process the history of presentation contexts and generate user-specific analytics.

The short-lived proxy token value 230 is provided to third parties in lieu of the stable anonymizing token value 220. Third-parties may use the proxy token value 230 in the same manner that they might use the stable anonymizing token value 220, but the shortened life-span prevents generation of extensive user-specific analytics. Furthermore, the short-lived proxy token value 230 can be third-party-specific, reducing the number of presentation contexts available even if multiple third-parties share information with each other.

In some implementations, the short-lived proxy token value 230 is generated to represent a specific stable anonymizing token value 220 to a specific third-party for a very limited period of time, where the limited period of time is extendable, by the third-party, up to (but not more than) a second period of time. In some such implementations, the time limitations are configurable. In some implementation, the short-lived proxy token value 230 is initially limited to a period of three days, and can be extended in one week increments up to at most a month. In some implementations, the third-party specifically requests the extension. In some implementations, the time period is extended based on third-party actions demonstrating reliance on the short-lived proxy token value 230.

The short-lived proxy token value 230 does not reveal any user or device specific information, and does not persist long enough for a third-party to generate invasive analytics. In some implementations, the short-lived proxy token value 230 is generated and stored, e.g., in storage 134, in association with the a user or device specific identifier 210 or in association with a stable anonymizing token value 220. In some implementations, the short-lived proxy token value 230 is generated as needed, e.g., as a function of the third-party identifier value, the stable token value, and a first-used date.

In some such implementations, a random salt value is generated and stored for use as an additional function input.

The short-lived proxy token value 230 is generated to be contextually unique. In some implementations, the short-lived proxy token value 230 is generated as a random alphanumeric string. In some implementations, the short-lived proxy token value 230 is generated by encrypting the stable anonymizing token value 220 using a key that is kept secret from the third-party; in some such implementations, the key is specific to the third-party, such that different keys are used for different third parties. In some implementations, the short-lived proxy token value 230 is generated using a one-way function, such as a hash-function, using the stable anonymizing token value 220 as input. Additional input to an encryption or one-way function can include the third-party identifier, one or more time stamps, and/or randomly generated salt values.

In some implementations, the short-lived proxy token value 230 is generated by encrypting the stable anonymizing token value 220 using a key that is specific to (but kept secret from) the receiving third-party. The key is stored, e.g., in storage 134, in association with an identifier for the third-party and the stable anonymizing token value 220. Whenever the proxy token value is to be changed, the encryption key is changed.

In some implementations, the short-lived proxy token value 230 is generated by encrypting the a random salt value and the stable anonymizing token value 220, using a one-time-use random key. The resulting short-lived proxy token value 230 is stored, e.g., in storage 134, in association with an identifier for the third-party and the stable anonymizing token value 220. Whenever the proxy token value is to be changed, the process is repeated with a new salt value and a new random key.

In some implementations, the short-lived proxy token value 230 is generated by encrypting a combination of the stable anonymizing token value 220 and a first-presentation date using a key that is specific to (but kept secret from) the receiving third-party. In some such implementations, the short-lived proxy token value 230 is the result of a one-way function using the encrypted combination as the input. The resulting proxy token value is unique to the stable token value and third-party pair, and changes whenever the first-presentation date changes.

Other methods of generating the short-lived proxy token value 230 are also within the scope of this disclosure. Methods that minimize the amount of data stored for each proxy token value improve memory utilization by increasing the number of entries that may be represented in a limited memory space. Methods that minimize the amount of computation needed to recall a previously used proxy token value improve processor utilization by reducing the processor time required to obtain a proxy token value. In some implementations, these improvements can improve the functionality of a computing system and improve the ability to scale to a large number of first-parties.

Figure 3:
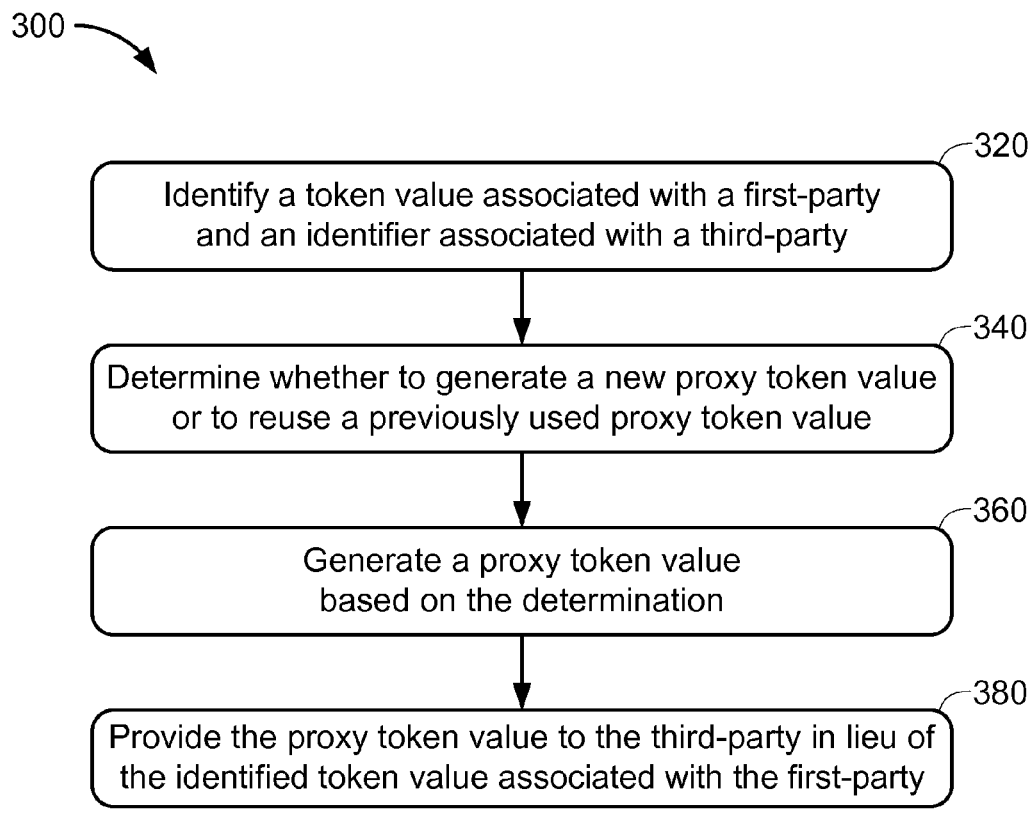
FIG. 3 is a flowchart for a method of providing a proxy token value to a third-party in lieu of another token value associated with a first-party.

FIG. 3 is a flowchart for a method 300 of providing a proxy token value to a third-party in lieu of another token value associated with a first-party. Referring to FIG. 3 in broad overview, the method 300 includes identifying, by an intermediary server 140 at stage 320, a token value associated with a first-party and an identifier associated with a third-party. The method 300 includes determining, by the intermediary server 140 at stage 340, whether to generate a new proxy token value or to reuse a previously-used proxy token value. If necessary, at stage 360, the method 300 includes generating a proxy token value based on the determination. Then, at stage 380, the method 300 includes providing the proxy token value to the third-party in lieu of the identified token value associated with the first-party.

Referring to FIG. 3 in more detail, at stage 320 of the method 300, the intermediary server 140 identifies a token value associated with a first-party and identifies an identifier associated with a third-party. The intermediary server 140 identifies this information as part of an information exchange with a first-party user device 120. In some implementations, the user device 120 is executing an application that includes the ability to present content to a user of the application, where at least some of the content presented is provided to the application via a network 110. In some implementations, the user device 120 is executing a Web browser application that makes HTML GET and HTML POST requests to one or more back-end servers 130 that host, or act as, Web servers. The Web servers respond to the Web browser application with data that is then processed by the browser application and presented, by the browser application, as one or more Web pages. The response data can include instructions for the Web browser application to make requests for additional data, where the requests may be directed to the same Web server or to another Web server, and where the results of the requests can be included in the presented Web pages in a unified manner. In some implementations, the user device 120 is executing an application that presents advertisements to a user of the application, where the advertisement content is received by the application via a network 110, e.g., from a third-party server 160. In some implementations, the intermediary server 140 provides, to one or more third party servers 160, a proxy token value anonymously and temporarily associated with the first-party or a device used by the first-party. The proxy token value is provided in lieu of a stable token value, and the intermediary server provides the third-party the proxy token value without providing the stable token value. In some implementations, once the server provides the third-party the proxy token value, the server never subsequently provides any of previous proxy token values to the third-party.

In some implementations, the intermediary server 140 invites multiple third parties to interact with the user device 120, e.g., through placement of content for display in by application 124 executing at the user device 120, and represents the first-party user device 120 to the third-parties using an anonymized token value, as described in reference to FIG. 2. A third party may then opt to act on the invitation, and respond to the intermediary server 140 referencing the token value provided. In some implementations, the invitation is a notification of a bid opportunity, and a third-party server 160 accepts the invitation by responding with a bid to place specific content on the user device 120 temporarily associated with the token value.

Referring still to FIG. 3, the intermediary server 140 identifies a token value associated with a first-party at stage 320. In some implementations, the intermediary server 140 receives the token value associated with the first-party directly from the first-party, or from a device controlled by the first-party. In some implementations, the intermediary server 140 obtains the token value associated with the first-party from a back end server 130 based on other information corresponding to the first-party. In some implementations, the intermediary server 140 uses network addressing information for a user device 120 to identify a token value associated with the first-party. In some implementations, the intermediary server 140 generates a random alpha-numeric value on a first encounter with a user device 120 and provides the random alpha-numeric value to the user device 120 for storage at the user device 120; the intermediary server 140 then obtains the stored alpha-numeric value from the user device 120 on subsequent encounters. The stored alpha-numeric value can be used as the token value associated with the first-party or can be used to identify a corresponding token value associated with the first-party. In some implementations, the user device 120 generates and controls the random alpha-numeric value.

The intermediary server 140 identifies an identifier associated with a third-party. The intermediary server 140 communicates with one or more third-parties to exchange information and perform transactions. In some implementations, the intermediary server 140 is in communication with one or more third-party servers 160. An intermediary server 140 may communicate with a third-party server 160 through a dedicated local network or through a shared network. In some implementations, the third-party server 160 is co-located with the intermediary server 140 in a common back end 130. The intermediary server 140 communicates with one or more third-parties, which are each associated with a respective identifier. In some implementations, the intermediary server 140 access a data storage system 134 to retrieve information pertaining to the third-parties, including identifiers associated with the third-parties.

At stage 340 of the method 300, the intermediary server 140 determines whether to generate a new proxy token value or to reuse a previously-used proxy token value in a data exchange with a third-party. If there is no previously-used proxy token value, the intermediary server 140 generates a new proxy token value. If there is a previously-used proxy token value, the intermediary server 140 determines whether it can be reused. In some implementations, the intermediary server 140 tests for one or more reset conditions and, if any of the reset conditions are satisfied, determines to generate a new proxy token value. In some implementations, the reset conditions are represented as a set of rules. In some implementations, the intermediary server 140 uses one or more timestamps associated with the a previously-used proxy token value to determine whether the previously-used proxy token value should be reused. In some implementations, the timestamps are stored in a data storage system 134. In some implementations, the intermediary server 140 makes a determination in accordance with the flowchart shown in FIG. 4, which is described in more detail below.

In some implementations, the intermediary server 140 generates a new proxy token value anytime the previously-used proxy token value has been in use for more than a threshold value, i.e., a maximum proxy continuity age. In some such implementations, the maximum proxy continuity age is configurable. In some implementations, the maximum proxy continuity age is a month. In some implementations, the maximum proxy continuity age is forty-five days.

In some implementations, the intermediary server 140 re-uses a previously-used proxy token value if the time elapsed since first presentation of the previously-used proxy token value to the third-party is less than a threshold value, i.e., a minimum proxy continuity age. In some such implementations, the minimum proxy continuity age is configurable. In some implementations, the minimum proxy continuity age is two days. In some implementations, the minimum proxy continuity age is three or four days.

In some implementations, the intermediary server 140 re-uses a previously-used proxy token value if the time elapsed since the third-party last affirmatively demonstrated reliance on the previously-used proxy token value is still within a threshold value, i.e., a proxy reliability age window. In some such implementations, the proxy reliability age window is configurable. In some such implementations, the proxy reliability age window is one week. In some implementations, a third-party can affirmatively demonstrate reliance on the previously-used proxy token value by taking a reliance action, such as using the previously-used proxy token value in an interaction with the intermediary server 140. Each reliance action re-starts the window of time. However, even if the third-party consistently takes such reliance actions, the previously-used proxy token value will still be reset when the time elapsed since first presentation of the previously-used proxy token value to the third-party exceeds the maximum proxy continuity age.

In some implementations, at stage 340 of the method 300, the intermediary server 140 determines whether to generate a new proxy token value or to reuse a previously-used proxy token value in a data exchange with a third-party by calling a Boolean function and providing timestamp information. The Boolean function tests for various proxy-value reset conditions and returns True or False based on whether the proxy value should be reset, i.e., when a reset condition is satisfied. In some implementations, the Boolean function uses threshold values for a maximum reliability time threshold (e.g. "max_reliability_window"), a minimum age threshold (e.g. "min_continuity_age"), and a maximum age threshold (e.g. "max_continuity_age"). In some such implementations, the maximum age threshold is a value between twenty and forty-five days, the maximum reliability time threshold is a value between five and ten days, and the minimum age threshold is a value less than five days. In some implementations, the Boolean function resembles the following pseudo-code:

```
Boolean UseNewProxyValue( ) {
    return True if current_time - first_presented > max_continuity_age;
    return False if current_time - first_presented < min_continuity_age;
    return False if current_time - last_reliance < max_reliability_window;
    return True; }
```

If necessary, at stage 360, the method 300 includes generating a proxy token value based on the determination. In some implementations, the intermediary server 140 generates the new proxy token value. In some implementations, the intermediary server 140 causes another back end server 130 to generate a new proxy token value. The new proxy token value is generated in the same manner as the previously-used proxy token value. Generating proxy token values is described above, in reference to FIG. 2.

At stage 380, the method 300 includes providing the proxy token value to the third-party in lieu of the identified token value associated with the first-party. That is, the third-party expects a token value that is uniquely and consistently associated with the first-party. The token value associated with the first-party and identified at stage 320 is uniquely and consistently associated with the first-party; however, that token value is stable in comparison to the proxy token value (either a new proxy token value or a previously used proxy token value). In lieu of providing a stable value, which might be tracked over a long period of time, the intermediary server 140 provides the third-party with the short-lived proxy token value based on the determination in stage 340. In some implementations, the intermediary server 140 provides the proxy token value to a third-party server 160. In some implementations, the intermediary server 140 provides the proxy token value to a third-party as part of an invitation to take an action using the token value. In some implementations, the intermediary server 140 provides the proxy token value to a third-party as information used by the third-party for determining whether to bid for the delivery of content to the first-party. If the third-party responds, e.g., placing a bid, then the third-party has taken an action relying on the proxy token value.

Figure 4:
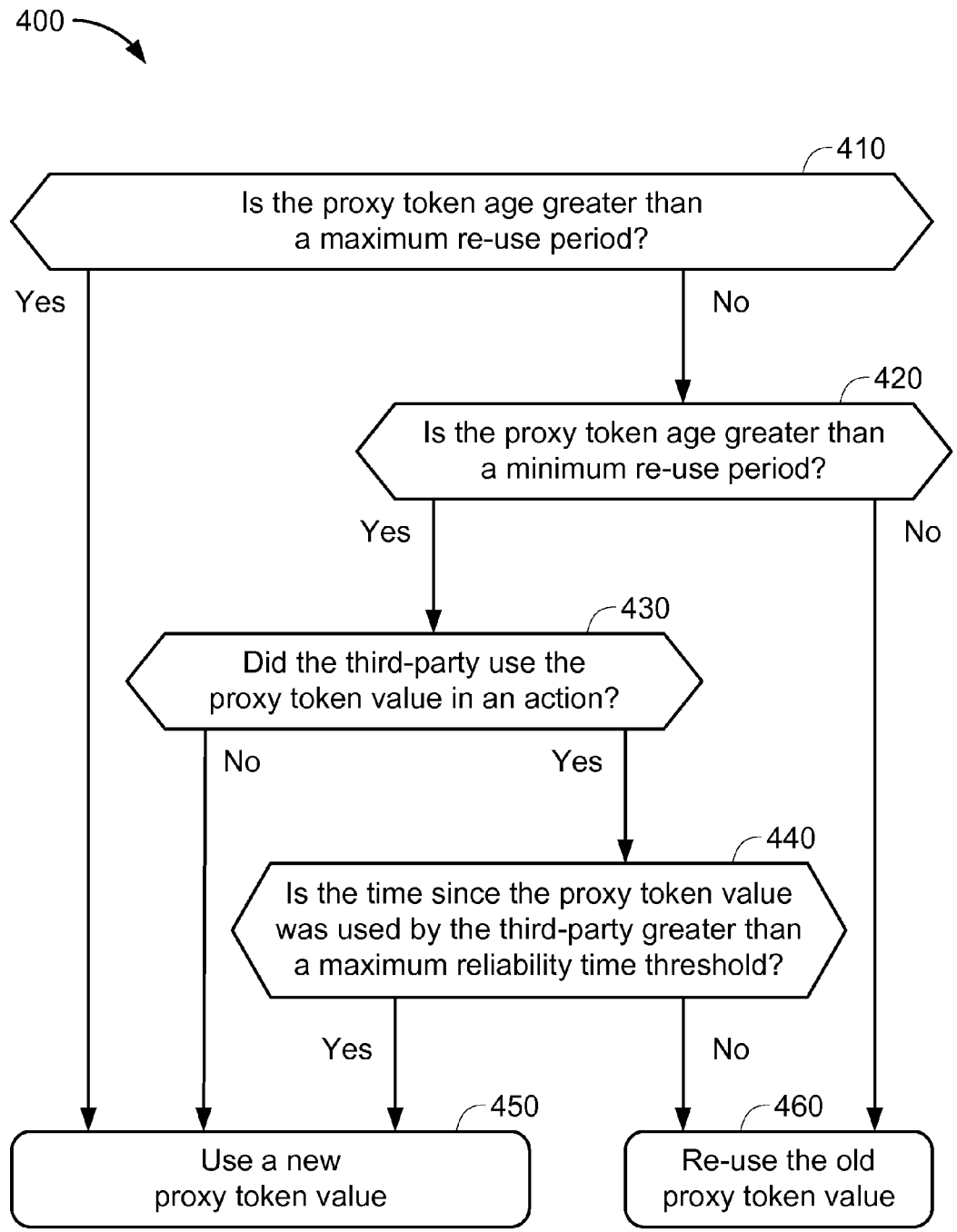
FIG. 4 is a decision tree flowchart for determining whether to generate a new proxy token value in a data exchange with a third-party.

FIG. 4 is a decision tree flowchart for determining whether to generate a new proxy token value, or to reuse a previously-used proxy token value, in a data exchange with a third-party. The decision tree 400 starts with a proxy token value that has been presented to a third-party on at least one prior occasion. If no proxy token value has been presented to the third-party, one would be generated without using the decision tree 400. In broad overview, the decision tree 400 includes a stage 410 for determining whether the proxy token age is greater than a maximum re-use period. If the proxy token age is not greater than the maximum re-use period, the decision tree 400 includes a stage 420 for determining whether the proxy token age is greater than a minimum re-use period. If the proxy token age is greater than the minimum re-use period, the decision tree 400 includes a stage 430 for determining whether the third-party has used the proxy token value in an action. If the third-party has used the proxy token value in an action, the decision tree 400 includes a stage 440 for determining whether the proxy token value was used by the third-party within a maximum reliability time threshold. Based on the determining stages 410, 420, 430, and 440, the decision tree 400 includes a result stage 450 wherein a new proxy token value is used and a result stage 460 wherein the old proxy token value is re-used.

Referring to FIG. 4 in more detail, at stage 410, the decision tree 400 determines whether the proxy token age is greater than a maximum re-use period. The age of the proxy token value is the difference between the time when stage 410 occurs and the time the token value was first presented to the third-party. In some implementations, an intermediary server 140 compares a current time to a first presentation time stored in association with the proxy token value (or in association with a corresponding stable token value) and calculates an age for the proxy token value. In some implementations, the maximum re-use period is configurable. In some implementations, the maximum re-use period is a month. In some implementations, the maximum re-use period is two months. In some implementations, the time values used in stage 410 are represented as an integer number of days since an initial anchor date (i.e., an epoch). If the proxy token age is greater than the maximum re-use period, the decision tree 400 proceeds from stage 410 to stage 450, and uses a new proxy token value.

At stage 420, if the proxy token age is not greater than the maximum re-use period at stage 410, the decision tree 400 determines whether the proxy token age is greater than a minimum re-use period. The age of the proxy token value is the difference between the time when stage 420 occurs and the time the token value was first presented to the third-party. In some implementations, an intermediary server 140 compares a current time to a first presentation time stored in association with the proxy token value (or in association with a corresponding stable token value) and calculates an age for the proxy token value. In some implementations, the minimum re-use period is configurable. In some implementations, the minimum re-use period is two days. In some implementations, the minimum re-use period is three days. In some implementations, the time values used in stage 420 are represented as an integer number of days since an initial anchor date (i.e., an epoch). If the proxy token age is less than the minimum re-use period, the decision tree 400 proceeds from stage 420 to stage 460, and re-uses the old proxy token value.

At stage 430, if the proxy token age is greater than the minimum re-use period at stage 420, the decision tree 400 determines whether the third-party has used the proxy token value in an action. In some implementations, a third-party can affirmatively demonstrate reliance on the previously-used proxy token value by taking a reliance action, such as using the previously-used proxy token value in an interaction with the intermediary server 140. In some implementations, the third-party can request that a specific proxy token value be re-used. In some implementations, if the third-party engages in a transaction using the proxy token value, the third-party has taken an action relying on the proxy token value. The intermediary server 140 records (e.g., in storage system 134) the date or time when the third-party has used the proxy token value in an action. If the third-party has not used the proxy token value in an action, aand the proxy token age exceeds the minimum re-use period as determined at stage 420, the decision tree 400 proceeds from stage 430 to stage 450, and uses a new proxy token value.

At stage 440, if the third-party has used the proxy token value in an action, the decision tree 400 determines whether the proxy token value was used by the third-party within a maximum reliability time threshold. In some implementations, an intermediary server 140 compares a current time to a last-used time stored in association with the proxy token value (or in association with a corresponding stable token value) and calculates a time since the proxy token value was last used by the third-party. The intermediary server 140 then compares this time to a maximum reliability time threshold. In some implementations, the maximum reliability time threshold is configurable. In some implementations, the maximum reliability time threshold is five days. In some implementations, the maximum reliability time threshold is seven days. In some implementations, the maximum reliability time threshold is fifteen days. In some implementations, the time values used in stage 440 are represented as an integer number of days since an initial anchor date (i.e., an epoch). If the time since the proxy token value was last used by the third-party is greater than the maximum reliability time threshold, the decision tree 400 proceeds from stage 440 to stage 450, and uses a new proxy token value. If the time since the proxy token value was last used by the third-party is less than the maximum reliability time threshold, the decision tree 400 proceeds from stage 440 to stage 460, and re-uses the old proxy token value. The old proxy token value can be re-used in this manner until the decision at stage 410 determines that the proxy token value is older than a maximum re-use period, as described above.

At stage 450, where a new proxy token value is used, the new proxy token value is generated by the intermediary server 140 as described above, in reference to FIG. 2.

The old proxy token value is only re-used, at stage 460, when the proxy token age is less than a maximum re-use period. The old proxy token value is also only re-used, at stage 460, when the proxy token age is either less than a minimum re-use period or when the third-party has affirmatively relied on the proxy token value within a limited maximum reliability time threshold.

Figure 5:
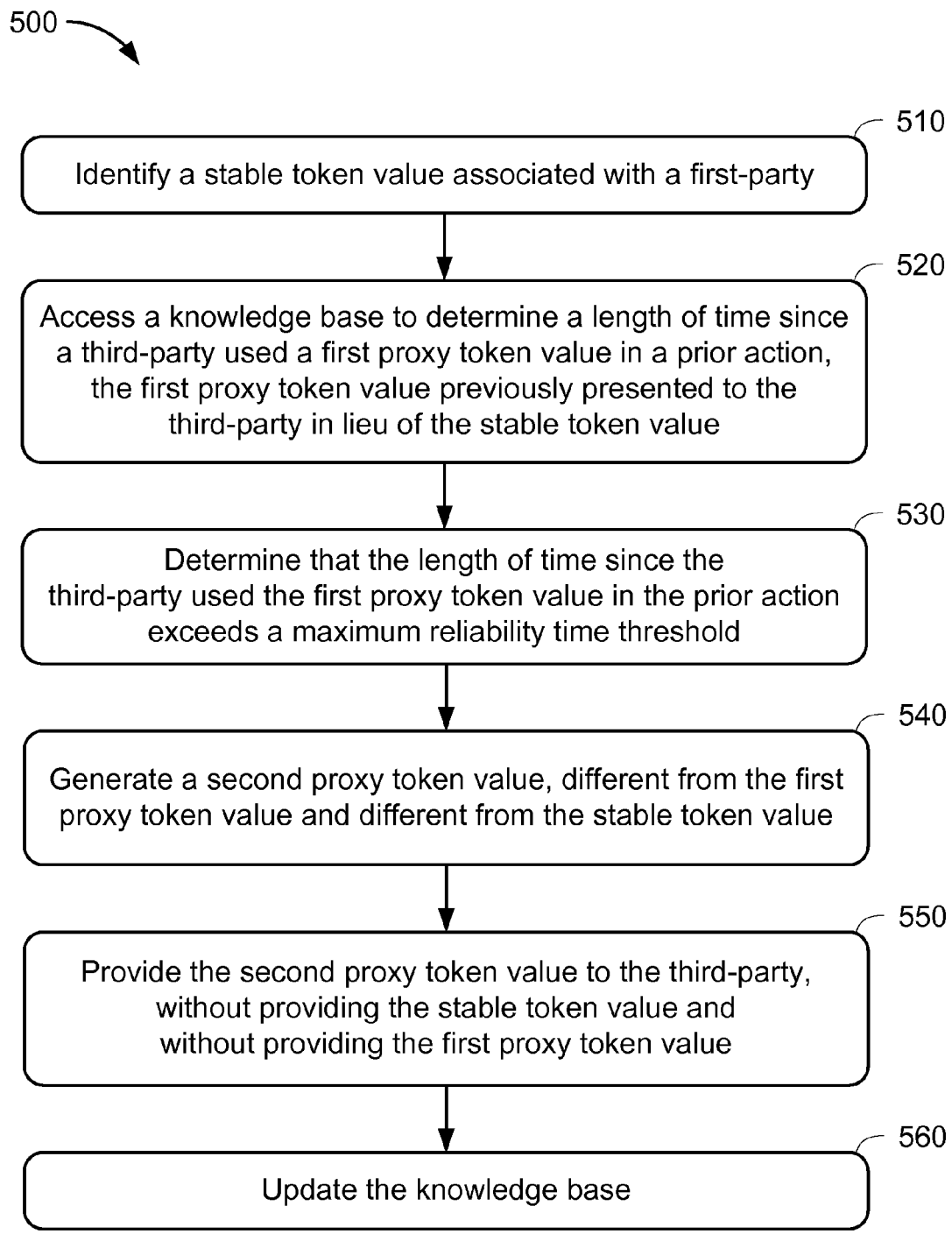
FIG. 5 is a flowchart illustrating a flow in which a third-party has received a first token value in a first transaction and receives a second token value in a subsequent transaction.

FIG. 5 is a flowchart illustrating a flow 500 in which a third-party has received a first token value associated with a user device, or user application, and receives a second token value associated with the same user device, or user application, in a subsequent transaction. The flow 500 illustrates a scenario in which the third-party does not receive information in the subsequent transaction that would correlate back to the prior transaction. The flow 500 is a use case consistent with the method 300 illustrated in FIG. 3 using the decision tree 400 illustrated in FIG. 4.

Referring to FIG. 5 in broad overview, the flow 500 begins with an intermediary server 140 identifying a stable token value associated with a first-party (stage 510). The intermediary server 140 accesses a knowledge base to determine a length of time since a third-party used a first proxy token value in a prior action, where the first proxy token value had previously been presented to the third-party in lieu of the stable token value (stage 520). The intermediary server 140 determines that the length of time since the third-party used the proxy token value in the prior action exceeds a maximum reliability time threshold (stage 530) and, responsive to the determination at stage 530, the intermediary server 140 generates a second proxy token value, different from the first proxy token value and different from the stable token value (stage 540). The intermediary server 140 then provides the second proxy token value to the third-party for use in an action, without providing the stable token value and without providing the first proxy token value (stage 550). The intermediary server 140 updates the knowledge base accordingly (stage 560).

Referring to FIG. 5 in more detail, at stage 510, an intermediary server 140 identifies a stable token value associated with a first-party. The intermediary server 140 is in communication with a user device 120 and, based on that communication, identifies a token value associated with either the user device itself or an operational characteristic of the user device, such as an application 124 executing on the user device or credentials presented by the user device to the intermediary server 140.

At stage 520, the intermediary server 140 accesses a knowledge base to determine a length of time since a third-party used a first proxy token value in a prior action. In the flow 500, the first proxy token value has previously been presented to the third-party in lieu of the stable token value. The previous presentation is reflected by data stored in the knowledge base. In some implementations, the knowledge base resides at the data storage system 134. The intermediary server 140 queries the knowledge base with the stable token value identified at stage 510 and locates one or more records. In some implementations, the records identify a first presentation date for the first proxy token value and a last reliance date for a third-party action relying on that first proxy token value. In some implementations, if the third-party had not taken an action relying on the first proxy token value, the records would indicate a place-holder value for the last reliance date, where the place-holder value is either an invalid date or a date prior to the first presentation date. In some implementations, the records identify the first proxy token value. In some implementations, the records identify information used by the intermediary server 140 to re-generate the first proxy token value.

At stage 530, the intermediary server 140 determines whether the length of time since the third-party used the proxy token value in the prior action exceeds a maximum reliability time threshold. The maximum reliability time threshold is a length of time that the third-party can reasonably expect a proxy token value to be reused after the third-party takes an action affirmatively relying on the proxy token value. In some implementations, the maximum reliability time threshold is configured for a specific set of third-parties. In some implementations, the maximum reliability time threshold is configured for a specific set of first-parties. In some implementations, the maximum reliability time threshold is configured based on a location of a back end server 130. In some implementations, the maximum reliability time threshold is between five and ten days. Each time a third-party takes an action relying on the proxy token value, there is a new last-reliance date, effectively resetting the length of time since the third-party used the proxy token value.

At stage 540, responsive to determining at stage 530 that the length of time since the third-party used the first proxy token value in the prior action exceeds the maximum reliability time threshold, the intermediary server 140 generates a second proxy token value, different from the first proxy token value and different from the stable token value (stage 540). The second proxy token value is generated as described in reference to FIG. 2. The second proxy token value replaces the first proxy token value. In some implementations, the intermediary server 140 verifies that the second proxy token value is contextually unique. That is, that the second proxy token value is a unique token value within the context of interactions between the intermediary server 140 and the third-party. In some implementations, sufficient uniqueness is ensured by encrypting information specific to the transaction in a manner that cannot be decrypted by the third-party. In some implementations, as shown in FIG. 4, a new proxy token value will be generated even if the length of time since the third-party used the proxy token value in the prior action (determined in stage 520) does not exceed the maximum reliability time threshold, e.g., where the age of the proxy token value exceeds a maximum age. In the flow 500, the intermediary server 140 generates a second proxy token value, different from the first proxy token value and different from the stable token value, responsive to determining that the length of time since the third-party relied on the first proxy token value has exceeded a maximum threshold.

At stage 550, the intermediary server 140 provides, to the third-party, the second proxy token value without providing the stable token value and without providing the first proxy token value. That is, the third-party receives the second proxy token value in lieu of the stable token value and instead of the first proxy token value previously received by the third-party in lieu of the stable token value. The first proxy token value, previously received by the third-party, is not provided to the third-party concurrently with the second proxy token value. The second proxy token value is provided for use by the third-party. In some implementations, the third-party receives the second proxy token value in an invitation to take an action. In some implementations, the invitation is a solicitation for a transaction related to the user or user device obscurely associated with the second proxy token value. If the third-party enters into the transaction, the third-party relies on the value of the second proxy token value, as described above.

At stage 560, the intermediary server 140 updates the knowledge base accordingly. In some implementations, the intermediary server 140 updates the knowledge base with a new first presentation date for the newly generated second proxy token value. In some implementations, if the third-party takes an action relying on the second proxy token value, the intermediary server 140 updates the knowledge base with a new last-reliance date for the second proxy token value. In some implementations, the intermediary server 140 updates the knowledge base with the second proxy token value itself. In some implementations, the proxy token value is generated as needed by encrypting the first presentation date and the stable token value with an encryption key specific to, but secret from, the third-party. In such implementations, changing the first presentation date effectively changes the proxy token value from a first proxy token value to a second proxy token value.

FIG. 6 is a block diagram of a computing system 910 suitable for use in implementing the computerized components described herein. In broad overview, the computing system 910 includes at least one processor 950 for performing actions in accordance with instructions, and one or more memory devices 970 and/or 975 for storing instructions and data. The illustrated computing system 910 includes one or more processors 950 in communication, via a bus 915, with memory 970 and with at least one network interface controller 920 with a network interface 922 for connecting to external network devices 924, e.g., participating in a network (such as the networks 110, 160, and 180 shown in FIG. 1). The one or more processors 950 are also in communication, via the bus 915, with any I/O devices at one or more I/O interfaces 930, and any other devices 980. The processor 950 illustrated incorporates, or is directly connected to, cache memory 975. Generally, a processor will execute instructions received from memory.

In more detail, the processor 950 may be any logic circuitry that processes instructions, e.g., instructions fetched from the memory 970 or cache 975. In many embodiments, the processor 950 is a microprocessor unit or special purpose processor. The computing device 910 may be based on any processor, or set of processors, capable of operating as described herein. The processor 950 may be a single core or multi-core processor. The processor 950 may be multiple processors.

The memory 970 may be any device suitable for storing computer readable data. The memory 970 may be a device with fixed storage or a device for reading removable storage media. The memory 970 may include any form of non-volatile memory, media and memory devices, semiconductor memory devices (e.g., EPROM, EEPROM, SDRAM, and Flash memory devices), magnetic disks, magneto optical disks, and/or optical discs (e.g., CD ROM, DVD-ROM, and Blu-Ray® discs). A computing system 910 may have any number of memory devices 970.

The cache memory 975 is generally a form of computer memory placed in close proximity to the processor 950, e.g., for fast read times. In some implementations, the cache memory 975 is part of, or on the same chip as, the processor 950. In some implementations, there are multiple levels of cache 975, e.g., L2 and L3 cache layers.

The network interface controller 920 manages data exchanges via the network interface 922. The network interface controller 920 handles the physical and data link layers of the OSI model for network communication. In some implementations, some of the network interface controller's tasks are handled by the processor 950. In some implementations, the network interface controller 920 is part of the processor 950. In some implementations, a computing system 910 has multiple network interface controllers 920. In some implementations, the network interface 922 is a connection point for a physical network link, e.g., an RJ 45 connector. In some implementations, the network interface controller 920 supports wireless network connections and an interface port 922 is a wireless receiver/transmitter. Generally, a computing device 910 exchanges data with other computing devices 924 via physical or wireless links to a network interface 922. In some implementations, the network interface controller 920 implements a network protocol such as Ethernet.

The other computing devices 924 are connected to the computing device 910 via a network interface 922 (sometimes referred to as a "port" or "physical port," so as to distinguish from a protocol-level port). The other computing device 924 may be a peer computing device, a network device, or any other computing device with network functionality. In some implementations, the other computing device 924 is a network device such as a hub, a bridge, a switch, or a router, such that the other computing device 924 connects the computing device 910 to a data network such as the Internet.

In some uses, the I/O interface 930 supports an input device and/or an output device (not shown). In some uses, the input device and the output device are integrated into the same hardware, e.g., as in a touch screen. In some uses, such as in a server context, there is no I/O interface 930 or the I/O interface 930 is not used. In some uses, additional other components 980 are in communication with the computer system 910, e.g., external devices connected via a universal serial bus (USB).

The other devices 980 may include an I/O interface 930, external serial device ports, and any additional co-processors. In some implementations, a computing system 910 includes an interface (e.g., a universal serial bus (USB) interface) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 910, e.g., a touch screen on a tablet device. In some implementations, a computing device 910 includes an additional device 980 such as a co-processor, e.g., a math co-processor that can assist the processor 950 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A system for facilitating interaction between a third-party and client devices, the system comprising:
    a data storage element storing a knowledge base; and
    an intermediary server in communication with the data storage element, the intermediary server comprising at least one network interface and at least one processor, the at least one processor configured to execute instructions that cause the intermediary server to perform operations including:
        receiving a first content request from a given client device;
        identifying a stable token value associated with the given client device;
        generating a first temporary token for the given client device, wherein the first temporary token differs from the stable token value;
        accessing the knowledge base to determine when the third party provided content to the given client device using the first temporary token provided by the intermediary server;
        receiving a second content request from the given client device;
        determining that a length of time since the third-party used the first temporary token to provide content to the given user device exceeds a maximum reliability time threshold;
        generating, responsive to the determination that the length of time exceeds the maximum reliability time threshold and in response to receiving the second content request, a second temporary token, different from the first temporary token and different from the stable token value; and
        providing, to the third-party, the second temporary token without providing the stable token value and without providing the first temporary token.

2. The system of claim 1, the at least one processor further configured to execute instructions to identify the first temporary token based on at least one of a client device, a service account authorized for access from the client device, or an application instance executing on the client device.

3. The system of claim 1, the at least one processor further configured to generate the second temporary token by encrypting, using an encryption key specific to the third-party, data that includes at least the stable token value, wherein the encryption key is kept secret from the third-party.

4. The system of claim 3, wherein the data further includes date information for when the second temporary token is first presented to the third-party.

5. The system of claim 1, the operations further including:
    accessing the knowledge base to determine a length of time since the second temporary token was first presented to the third-party;

determining that the length of time since the second temporary token was first presented to the third-party exceeds a maximum age threshold;
generating, responsive to the determination that the length of time since the second temporary token was first presented to the third-party exceeds the maximum age threshold, a third temporary token, different from the second temporary token and different from the stable token value; and
providing, to the third-party, the third temporary token without providing the stable token value and without providing the second temporary token.

6. The system of claim 1, comprising a configuration storing values for the maximum reliability time threshold, a minimum age threshold, and a maximum age threshold.

7. The system of claim 6, wherein the configuration stores different values in association with respective different third-parties.

8. The system of claim 6, wherein the maximum age threshold is between twenty and forty-five days, the maximum reliability time threshold is between five and ten days, and the minimum age threshold is less than five days.

9. The system of claim 1, wherein the data storage element stores timestamps in the knowledge base in association with the stable token value and an identifier for the third-party, the timestamps indicating at least a first time that a most-recent proxy token value was provided to the third-party and a most-recent time that the third-party used the most-recent proxy token value in an action.

10. The system of claim 9, the at least one processor further configured to execute instructions to update the timestamps responsive to determining that a proxy-value reset condition is satisfied.

11. The system of claim 9, the at least one processor further configured to execute instructions to update the timestamps responsive to the most-recent proxy token value changing from the first temporary token to the second temporary token.

12. The system of claim 1, the operations further including providing the second proxy token value to the third-party in an invitation to use the second temporary token in an action, and to receive, from the third-party, a request to take the action responsive to the invitation.

13. A system for facilitating interaction between a third-party and client devices, the system comprising:
a data storage element storing a knowledge base; and
an intermediary server in communication with the data storage element, the intermediary server comprising at least one network interface and at least one processor, the at least one processor configured to execute instructions that cause the intermediary server to perform operations including:
identify a stable token value associated with a first-party;
access the knowledge base to determine a length of time since the third-party used a first proxy token value in a prior action, the first proxy token value previously presented to the third-party in lieu of the stable token value;
determine that the length of time since the third-party used the first proxy token value in the prior action exceeds a maximum reliability time threshold;
generate, responsive to the determination that the length of time since the third-party used the first proxy token value in the prior action exceeds the maximum reliability time threshold, a second proxy token value, different from the first proxy token value and different from the stable token value;
provide, to the third-party, the second proxy token value without providing the stable token value and without providing the first proxy token value;
access the knowledge base to determine a length of time since the second proxy token value was first presented to the third-party and that the third-party has not used the second proxy token value in any action;
determine that the length of time since the second proxy token value was first presented to the third-party exceeds a minimum age threshold;
generate, responsive to the determination that the length of time since the second proxy token value was first presented to the third-party exceeds the minimum age threshold, a third proxy token value, different from the second proxy token value and different from the stable token value; and
provide, to the third-party, the third proxy token value without providing the stable token value and without providing the second proxy token value.

14. A method of facilitating interaction between a third-party and client devices, the method comprising:
receiving, by an intermediary server, a first content request from a given client device;
identifying, by the intermediary server comprising at least one network interface and at least one processor, a stable token value associated with the given client device;
generating, by the intermediary server, a first temporary token for the given client device, wherein the first temporary token differs from the stable token value;
accessing, by the intermediary server, a knowledge base to determine when the third party provided content to the given client device using the first temporary token provided by the intermediary server;
receiving, by the intermediary server, a second content request from the given client device;
determining, by the intermediary server, that a length of time since the third-party used the first temporary token to provide content to the given user device exceeds a maximum reliability time threshold;
generating, by the intermediary server responsive to the determination that the length of time exceeds the maximum reliability time threshold and in response to receiving the second content request, a second temporary token, different from the first temporary token and different from the stable token value; and
providing, by the intermediary server, to the third-party, the second temporary token without providing the stable token value and without providing the first temporary token.

15. The method of claim 14, comprising identifying the first temporary token based on at least one of a client device, a service account authorized for access from the client device, or an application instance executing on the client device.

16. The method of claim 14, comprising generating the second temporary token by encrypting, using an encryption key specific to the third-party, data that includes at least the stable token value, wherein the encryption key is kept secret from the third-party.

17. The method of claim 14, comprising storing different configuration values in association with respective different third-parties, the configuration values comprising values for a maximum reliability time threshold, a minimum age threshold, and a maximum age threshold.

18. The method of claim 14, comprising storing, in the knowledge base, timestamps in association with the stable token value and an identifier for the third-party, the timestamps indicating at least a first time that a most-recent proxy token value was provided to the third-party and a most-recent time that the third-party used the most-recent proxy token value in an action.

19. The method of claim 18, comprising updating the stored timestamps responsive to determining that a proxy-value reset condition is satisfied.

20. A non-transitory computer-readable medium storing instructions that, when executed by one or more computing processors of an intermediary server, cause the intermediary server to:
- receive a first content request from a given client device;
- identify a stable token value associated with the given client device;
- generate a first temporary token for the given client device, wherein the first temporary token differs from the stable token value;
- access a knowledge base to determine when the third party provided content to the given client device using the first temporary token provided by the intermediary server;
- receive a second content request from the given client device;
- determine that a length of time since the third-party used the first temporary token to provide content to the given user device exceeds a maximum reliability time threshold;
- generate, responsive to the determination that the length of time exceeds the maximum reliability time threshold and in response to receiving the second content request, a second temporary token, different from the first temporary token and different from the stable token value; and
- provide, to the third-party, the second temporary token without providing the stable token value and without providing the first temporary token.

\* \* \* \* \*